(12) United States Patent
Cerny et al.

(10) Patent No.: US 7,434,404 B2
(45) Date of Patent: Oct. 14, 2008

(54) METHOD FOR OPERATING A GAS TURBINE COMBUSTION CHAMBER INCLUDING A PLURALITY OF BURNERS ARRANGED IN GROUPS

(75) Inventors: Jan Cerny, Fahrwangen (CH); Anurag Jhalani, Untersiggenthal (CH)

(73) Assignee: ALSTOM Technology Ltd., Baden (CH)

( * ) Notice: Subject to any disclaimer, the term of this patent is extended or adjusted under 35 U.S.C. 154(b) by 489 days.

(21) Appl. No.: 11/036,108

(22) Filed: Jan. 18, 2005

(65) Prior Publication Data

US 2005/0160739 A1    Jul. 28, 2005

(30) Foreign Application Priority Data

Jan. 19, 2004    (DE) .................. 10 2004 002 631

(51) Int. Cl.
  *F02C 7/22*    (2006.01)
  *F02C 7/26*    (2006.01)
(52) U.S. Cl. .......................................... 60/776; 60/739
(58) Field of Classification Search .................. 60/739, 60/742, 746, 776
  See application file for complete search history.

(56) References Cited

U.S. PATENT DOCUMENTS

| | | | | |
|---|---|---|---|---|
| 4,027,473 A | * | 6/1977 | Baker | 60/39.281 |
| 4,062,183 A | * | 12/1977 | Davies et al. | 60/39.094 |
| 4,817,389 A | * | 4/1989 | Holladay et al. | 60/739 |
| 5,036,657 A | * | 8/1991 | Seto et al. | 60/39.281 |
| 5,226,287 A | * | 7/1993 | Ng | 60/39.281 |
| 5,303,542 A | * | 4/1994 | Hoffa | 60/773 |
| 5,729,968 A | * | 3/1998 | Cohen et al. | 60/39.6 |
| 5,884,483 A | * | 3/1999 | Munro | 60/739 |
| 6,434,945 B1 | * | 8/2002 | Mandai et al. | 60/740 |
| 6,640,548 B2 | * | 11/2003 | Brushwood et al. | 60/776 |

(Continued)

FOREIGN PATENT DOCUMENTS

DE    195 45 311    6/1997

(Continued)

*Primary Examiner*—William H Rodriguez
(74) *Attorney, Agent, or Firm*—Adam J. Cermak; Cermak Kenealy & Vaidya LLP

(57) ABSTRACT

A method for operating a combustion chamber (1) for a gas turbine. The combustion chamber (1) has a combustion space (2) and a plurality of burners (3), which are each arranged at an inlet (13) of the combustion space (2). The burners (3) are divided into two burner groups ($4_I$, $4_{II}$). A common oxidant supply (5) is provided for all the burners (3). A common first fuel supply (7) is provided for the burners ($3_I$) belonging to the first burner group ($4_I$). A common second fuel supply (9) and a common additional fuel supply (11) are provided for the burners ($3_{II}$) belonging to the second burner group ($4^{II}$). A first fuel stream (8) is fed to the burners ($3_I$) belonging to the first fuel group ($4_I$), in such a manner that a lean fuel/oxidant mix is established. A second fuel stream (10) is fed to the burners ($3_{II}$) belonging to the second burner group ($4_{II}$) in such a manner that a lean fuel/oxidant mix is established. The first fuel stream (8) for each burner ($3_I$) belonging to the first burner group ($4_I$) is selected to be greater than the second fuel stream (10) for each burner ($3_{II}$) belonging to the second burner group ($4_{II}$). In addition, an additional fuel stream (12) is fed to the burners ($3_{II}$) belonging to the second burner group ($4_{II}$).

6 Claims, 1 Drawing Sheet

U.S. PATENT DOCUMENTS

| | | |
|---|---|---|
| 6,681,556 B2 * | 1/2004 | Mistry et al. ............ 60/39.094 |
| 6,772,583 B2 * | 8/2004 | Bland ........................ 60/39.37 |
| 7,107,772 B2 * | 9/2006 | Chen et al. .................... 60/737 |
| 7,216,486 B2 * | 5/2007 | Doebbeling et al. ........... 60/773 |
| 2001/0047650 A1 * | 12/2001 | Muller et al. .............. 60/39.06 |
| 2002/0043067 A1 * | 4/2002 | Maeda et al. ................. 60/776 |
| 2003/0014979 A1 * | 1/2003 | Summerfield et al. ......... 60/776 |
| 2003/0217555 A1 * | 11/2003 | Gerhold ....................... 60/776 |
| 2005/0097895 A1 * | 5/2005 | Kothnur et al. ............... 60/776 |
| 2005/0268617 A1 * | 12/2005 | Amond et al. ................ 60/776 |
| 2006/0016198 A1 * | 1/2006 | Stuttaford et al. ............. 60/776 |
| 2006/0144049 A1 * | 7/2006 | Haffner et al. ................ 60/776 |

FOREIGN PATENT DOCUMENTS

| | | |
|---|---|---|
| DE | 199 44 922 | 3/2001 |
| EP | 0 976 982 | 2/2000 |
| WO | 03/062618 A1 | 7/2003 |

* cited by examiner

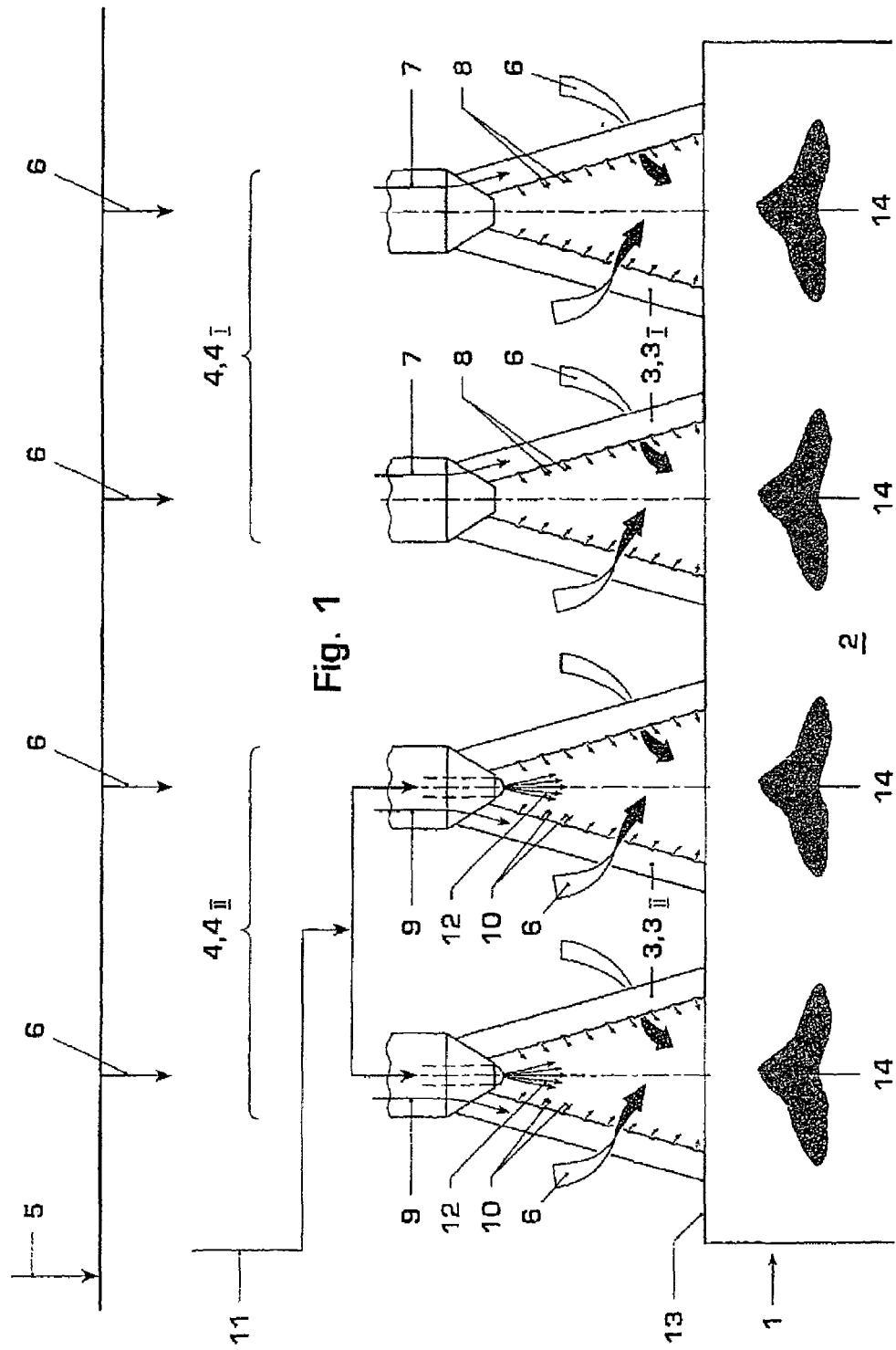

METHOD FOR OPERATING A GAS TURBINE COMBUSTION CHAMBER INCLUDING A PLURALITY OF BURNERS ARRANGED IN GROUPS

This application claims priority under 35 U.S.C. § 119 to German application number 10 2004 002 631.9, filed 19 Jan. 2004, the entirety of which is incorporated by reference herein.

BACKGROUND OF THE INVENTION

1. Technical Field

The present invention relates to a method for operating a combustion chamber for a gas turbine, the combustion chamber having a combustion space and a plurality of burners which are in each case arranged at an inlet of the combustion space.

2. Brief Description of the Related Art

To ensure that the minimum possible levels of pollutants are formed when a combustion chamber of this type is operating, the individual burners are supplied with a very lean fuel/oxidant mix, i.e., with relatively high $\lambda$ values. To avoid thermo-acoustic pressure pulses, it is in principle possible to divide the burners of the combustion chamber into two burner groups and for the burners belonging to the two burner groups to be supplied with fuel/oxidant mixes which, although lean, have different $\lambda$ values. Therefore, more fuel is available for conversion at the burners whose fuel/oxidant mix has a lower $\lambda$ value, which leads to higher temperatures during the combustion reaction in the combustion space and therefore to a reduction in the pressure pulsation.

However, it has been found that when the combustion chamber is operating with two burner groups, the burners belonging to these groups, the burners of which are operated with different $\lambda$ values, the total emission of pollutants increases, in particular the emission of $NO_x$ and visible flue gases (known as yellow plume), while at the same time the stability of the homogenous combustion reaction in the combustion space decreases.

SUMMARY OF THE INVENTION

The invention seeks to remedy this problem. The present invention deals with the problem of providing an improved operating method for a combustion chamber of the type described in the introduction which in particular makes it possible to reduce the emission of pollutants and to stabilize the homogenous combustion reaction.

One aspect of the present invention includes the general idea of feeding an additional fuel stream to the burners belonging to the burner group which is operated with the higher $\lambda$ value. In this context, the invention makes use of the discovery that during conventional operation with two burner groups which differ from one another by virtue of different lean $\lambda$ values, a steady flame front allowing a stable, homogenous combustion reaction is formed in the combustion space only for those burners which are operated with the lower $\lambda$ value. By contrast, a flame front of this type is not formed in the combustion chamber for the burners which are operated with the higher $\lambda$ value, and consequently the combustion reaction which takes place there generates lower temperatures. In this context, the discovery that the formation of the steady flame front causes the flow resistance to increase for the burners which are operated with the lower $\lambda$ values is of particular interest. This leads to a nonuniform distribution of the oxidant stream fed to all the burners in common. Consequently, an increased flow of oxidant occurs at the burners which are operated with higher $\lambda$ values. This results in interactions between the reaction zones of the burners belonging to the two burner groups within the combustion space. By way of example, this causes the extinction limit of the steady flame front to increase. Furthermore, the stability of the combustion reaction in the steady flame front may be reduced.

The injection, according to principles of the present invention, of an additional fuel stream for those burners which are operated with the higher $\lambda$ value now also allows a steady flame front to be established in the combustion chamber for these burners. The result of this is that for these burners too the flow resistance rises. Consequently, the total stream of oxidant fed to the burners is distributed more uniformly between the burners belonging to the two burner groups, with the result that the abovementioned interactions are reduced. Overall, the measure according to the invention allows the extinction temperature limits to be lowered for all burners, with the result that at the same time the stability of the homogenous combustion reaction is increased. Furthermore, the entry of a cold oxidant stream into the combustion chamber is suppressed. For the combustion chamber, this means that a considerable reduction in the pollutant emissions is established.

It can be particularly advantageous to use an embodiment in which the additional fuel stream is fed to the burners belonging to the second burner group in such a way that the fuel which is additionally supplied, within these burners, is not mixed or is only mixed to a slight extent with the oxidant fed to these burners. In other words, the mixing of the fuel which is additionally supplied with the oxidant takes place only in the combustion space, so that the combustion reaction can be deliberately established and stabilized there in the form of the steady flame front. Therefore, the additional fuel stream passes directly into the flame front without prior mixing and reaction with the oxidant.

It can be particularly expedient to use a configuration in which the burners are each configured as a premix burner, with the fuel streams being fed to the burners in such a way that the fuel is mixed with the oxidant fed to this burner within the respective burner. The invention therefore draws a clear distinction between the fuel streams for premixing with the oxidant and the additional fuel stream which is fed to the burners with the higher $\lambda$ value in the fuel/oxidant mix. It has been found that the injection of the additional fuel stream, in particular without it being mixed with the oxidant stream, leads to the desired stabilizing of the combustion reaction and to the desired reduction in the pollutant emissions, whereas in this respect a drop in the $\lambda$ value for the premix burners of the second burner group would not have the desired effect. In particular, the injection according to the invention of the additional fuel stream for the burners operated with the higher $\lambda$ value belonging to the second burner group also suppresses the formation of thermo-acoustic pressure pulses.

Further important features and advantages of the invention will emerge from the drawing and from the associated description of the FIGURES with reference to the drawing.

BRIEF DESCRIPTION OF THE DRAWINGS

A preferred exemplary embodiment of the invention is illustrated in the drawing and explained in more detail in the following description.

The only FIGURE, FIG. 1, shows a highly simplified outline illustration of an excerpt from a combustion chamber according to the invention.

DETAILED DESCRIPTION OF EXEMPLARY EMBODIMENTS

In accordance with FIG. 1, a combustion chamber 1 according to the invention has a combustion space 2, which is preferably of annular configuration. A longitudinal center line of this annular combustion space 2 extends perpendicular from the top downward, parallel to the plane of the drawing. Accordingly, the illustration presented in FIG. 1 shows only a limited peripheral portion of the combustion space 2. The combustion chamber 1 has a plurality of burners 3, which are divided into two burner groups 4, namely a first burner group $4_I$ and a second burner group $4_{II}$. The burner groups 4 are characterized by curly parentheses in FIG. 1. Accordingly, the individual burners 3 are assigned either to the first burner group $4_I$ or to the second burner group $4_{II}$ and are accordingly denoted by $3_I$ and $3_{II}$, respectively.

The individual burners 3 are arranged next to one another at an inlet 13 of the combustion space 2. In the case of an annular combustion space 2, the burners 3 are expediently arranged distributed over the periphery. In this case, the burners 3 which are arranged next to one another in the peripheral direction may form a burner ring. It is also possible to use embodiments in which two or more burner rings, which are spaced apart from one another in the radial direction, are formed at the inlet 13 of the combustion space 2. Each burner group 4 contains one or more burners 3, it being possible for the burners 3 belonging to the individual burner groups 4 to alternate in the peripheral direction, so that one or more burners 3 belonging to one group 4 follow one or more burners 3 belonging to the other group 4, as seen in the peripheral direction.

A common oxidant supply 5, which supplies the required oxidant, in particular air, to the burners 3, is provided for the two burner groups 4 and therefore for all the burners 3. A flow 6 of oxidant generated by the oxidant supply 5 is symbolically indicated by arrows in FIG. 1.

Furthermore, the combustion chamber 1 comprises a common first fuel supply 7 for the burners $3_I$ belonging to the first burner group $4_I$. A first fuel stream 8 fed to the burners $3_I$ belonging to the first burner group $4_I$ via the first fuel supply 7 is symbolically indicated by arrows. Accordingly, a second fuel supply 9 is provided for supplying fuel to the burners $3_{II}$ belonging to the second burner group $4_{II}$, a second fuel stream 10 which is provided via this second fuel supply 9 being symbolically indicated by arrows. The fuel used is preferably natural gas.

According to the invention, the combustion chamber 1 is now also equipped with an additional fuel supply 11, with the aid of which an additional fuel stream 12, likewise represented by arrows, can be fed to the second burner group $4_{II}$ or the burners $3_{II}$ thereof.

According to an exemplary embodiment, the burners 3 are in each case premix burners, in which the oxidant which is in each case supplied is intensively mixed with the fuel which is in each case supplied before the fuel/oxidant mix formed in this way enters the combustion space 2. By way of example, oxidant and fuel are supplied radially at the respective burner 3 and are also subjected to swirling, with the result that particularly intensive mixing is achieved.

By way of example, for this purpose the additional fuel stream 12 may be introduced into the burner 3 axially at the burner head, i.e., at an end remote from the combustion space 2, for the burners $3_{II}$ belonging to the second burner group $4_{II}$.

In principle, it is also conceivable for the additional fuel stream 12 in each case to be injected by means of a fuel lance, which is then arranged centrally within the respective burners $3_{II}$.

It is now of particular importance that the additional fuel supply 11 be configured in such a way that the additional fuel stream 12 which is additionally supplied flows through the respective burner $3_{II}$ unimpeded, as it were, without it being intensively mixed with the oxidant. In this way, the additional fuel stream 12 enters the combustion space 2 in, as it were, unmixed form.

In the exemplary embodiment shown here, the geometry of the burners 3 at the inlet 13 is configured in such a way that a sudden widening of the cross section at the transition to the combustion space 2 results. In combination with the swirl imparted to the fuel/oxidant mix, the swirl system as a result collapses in the combustion space 2, with the result that a recirculation zone, which can contribute to stabilizing a flame front 14, can form within the combustion space 2 downstream of each burner 3.

The combustion chamber 1 according to the invention operates as follows:

When the combustion chamber 1 is operating, a predetermined stream 6 of oxidant is fed to it via the oxidant supply 5. As a function of the desired power of the combustion chamber 1, a total fuel stream which has to be burnt in the combustion space 2 in order to provide the desired combustion chamber power is determined. A suitable control unit (not shown here) then determines, for each burner group 4, a suitable division factor which defines the distribution of the total fuel stream between the two burner groups 4. In this context, it is provided that the burners $3_I$ belonging to the first burner group $4_I$ are to be operated with a fuel/oxidant mix whose $\lambda$ value is greater than 1 but lower than the $\lambda$ value in the fuel/oxidant mix with which the burners $3_{II}$ belonging to the second burner group $4_{II}$ are operated. This stipulation ensures that both the burners $3_I$ belonging to the first burner group $4_I$ and the burners $3_{II}$ belonging to the second burner group $4_{II}$ are operated under lean conditions. In this context, it is important that in each case more fuel be fed to the burners $3_I$ belonging to the first burner group $4_I$ than to the burners $3_{II}$ belonging to the second burner group $4_{II}$. Consequently, a steady flame front 14 can in each case be established in the combustion space 2 at least downstream of the burner $3_I$ belonging to the first burner group $4_I$.

According to the invention, the additional fuel stream 12 is now additionally fed to the burners $3_{II}$ belonging to the second burner group $4_{II}$. As a result, in each case a steady flame front 14 can likewise form in the combustion chamber 2 downstream of the burners $3_{II}$ belonging to the second burner group $4_{II}$. Overall, as a result, a relatively homogenous temperature distribution can be achieved in the combustion space 2. At the same time, the pollutant emissions, in particular the emissions of $NO_x$, of CO and of visible flue gases, can be considerably reduced. Furthermore, the homogenous combustion reaction in the combustion space 2 is stabilized by the extinction temperature limit being lowered to a relatively low temperature. The establishment of a steady flame front 14 even downstream of the burners $3_{II}$ belonging to the second burner group $4_{II}$ also results in substantially the same flow resistance being established at these burners $3_{II}$ as at the burners $3_I$ belonging to the first burner group $4_I$. Accordingly, a substantially uniform distribution of the stream 6 of oxidant to the individual burners 3 is automatically established, which makes a considerable contribution to the desired stabilizing and homogenization of the reactions in the combustion space 2. Furthermore, the injection according to the invention of the additional fuel stream 12 makes it possible to select the division factors for the distribution of the total fuel stream in such a way that the λ values for the burners 3 belonging to the two burner groups 4 only differ from one another by a relatively small amount. This measure likewise leads to a homogenous temperature distribution in the combustion space 2 and therefore in particular to a reduction in the $NO_x$ formation.

It can be advantageous for the additional fuel stream 12 to be dimensioned in such a way that the combustion reaction downstream of the associated burners $3_{II}$ in the combustion space 2 as before continues to take place under lean conditions, i.e., with a λ value of greater than 1. In this context, an embodiment in which the quantity of the additional fuel stream 12 is made just equal to the quantitative difference between the first fuel stream 8 and the second fuel stream 10 may be of particular interest. In this way, ultimately the same quantity of fuel is fed to each burner $3_{II}$ belonging to the second burner group $4_{II}$ as to each burner $3_I$ belonging to the first burner group $4_I$. As an alternative or in addition, the dimensions of the additional fuel stream 12 may also be selected in such a way that ultimately a combustion reaction at approximately the same λ value is established in the combustion space 2 both downstream of the burners $3_{II}$ belonging to the second burner group $4_{II}$ and downstream of the burners $3_I$ belonging to the first burner group $4_I$.

LIST OF REFERENCE NUMERALS

1 Combustion chamber
2 Combustion space
3 Burner
4 Burner group
5 Oxidant supply
6 Oxidant stream
7 First fuel supply
8 First fuel stream
9 Second fuel supply
10 Second fuel stream
11 Additional fuel supply
12 Additional fuel stream
13 Inlet of 2
14 Flame front While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A method for operating a combustion chamber for a gas turbine, the combustion chamber having a combustion space and a plurality of burners which are each arranged at an inlet of the combustion space (2), the burners being divided into two burner groups having the same or a different number of burners, a common oxidant supply provided for all the burners, a common first fuel supply provided for the burners belonging to the first burner group, a common second fuel supply and a common additional fuel supply provided for the burners belonging to the second burner group, the method comprising:

feeding a first fuel stream to the burners belonging to the first burner group via the first fuel supply so that a lean fuel/oxidant mix is established at the burners belonging to the first burner group;

feeding a second fuel stream to the burners belonging to the second burner group via the second fuel supply so that a lean fuel/oxidant mix is established at the burners belonging to the second burner group;

wherein the first fuel stream for each burner is greater than the second fuel stream for each burner; and feeding an additional fuel stream to the burners belonging to the second burner group via the additional fuel supply.

2. The method as claimed in claim 1, wherein feeding the additional fuel stream to the burners belonging to the second burner group comprises feeding the additionally supplied fuel within the burners so that said fuel is at most slightly mixed with the oxidant fed to these burners.

3. The method as claimed in claim 1, wherein the burners are configured and arranged as premix burners; and wherein feeding the first fuel stream and feeding the second fuel stream to the burners comprise feeding so that, within the burners, fuel is mixed with oxidant fed to these burners.

4. The method as claimed in claim 3, wherein the first fuel stream and the second fuel stream are selected so that the fuel/oxidant mix formed in the burners belonging to the first burner group has a lower λ (air/fuel ratio) value than the fuel/oxidant mix formed in the burners belonging to the second burner group.

5. The method as claimed in claim 1, wherein the additional fuel stream is selected so that the combustion reaction in the combustion space takes place under lean conditions.

6. The method as claimed in claim 1, wherein the additional fuel stream is selected to be approximately equal to a difference between the first fuel stream and the second fuel stream.

* * * * *